(12) United States Patent
Trocme et al.

(10) Patent No.: US 10,723,404 B2
(45) Date of Patent: Jul. 28, 2020

(54) SYSTEM FOR CONTROLLING A VEHICLE FITTED WITH ELECTRICAL CONTROLS

(71) Applicants: Continental Automotive France, Toulouse (FR); Continental Automotive GmbH, Hannover (DE)

(72) Inventors: Loïc Trocme, Plaisance du Touch (FR); Pascal Rochard, Villeneuve Tolosane (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/484,205

(22) PCT Filed: Feb. 9, 2018

(86) PCT No.: PCT/FR2018/050320
§ 371 (c)(1),
(2) Date: Aug. 7, 2019

(87) PCT Pub. No.: WO2018/154209
PCT Pub. Date: Aug. 30, 2018

(65) Prior Publication Data
US 2019/0367120 A1 Dec. 5, 2019

(30) Foreign Application Priority Data

Feb. 23, 2017 (FR) ..................... 17 51418

(51) Int. Cl.
*B62K 11/14* (2006.01)
*B62K 23/02* (2006.01)
(Continued)

(52) U.S. Cl.
CPC .............. *B62K 11/14* (2013.01); *B62K 23/04* (2013.01); *F02D 9/1065* (2013.01); *F02D 11/02* (2013.01)

(58) Field of Classification Search
CPC ........ B62K 11/14; B62K 23/02; B62K 23/04; B60K 26/021; F02D 9/1065; F02D 11/02
See application file for complete search history.

(56) References Cited

U.S. PATENT DOCUMENTS 4,019,402 A * 4/1977 Leonheart .............. B62K 23/04
74/489
5,784,924 A * 7/1998 Wu ........................ B62K 23/04
74/142
(Continued)

FOREIGN PATENT DOCUMENTS

DE        10027193 A1    12/2001
DE        10238484 A1    3/2004
(Continued)

OTHER PUBLICATIONS

English Translation of the Written Opinion for International Application No. PCT/FR2018/050320, dated Jun. 14, 2018, 6 pages.
(Continued)

*Primary Examiner* — Adam D Rogers
(74) *Attorney, Agent, or Firm* — RatnerPrestia

(57) ABSTRACT

A system for controlling a vehicle fitted with electrical controls, the control system includes a handgrip mounted on a shaft and fitted with a position sensor and with a return spring which is fixed by one end to the handgrip so as to generate a return moment that opposes the twisting of the handgrip. The system includes at least one actuator able to move a cam mounted on the shaft and able to: modify the preload of the return spring according to the position of the cam to which the other end of the return spring is fixed, and/or modify the travel of the handgrip by collaborating with an end stop of the handgrip, the end stop coming into contact with a cam at the end of the travel.

7 Claims, 4 Drawing Sheets

(51) Int. Cl.
*B62K 23/04* (2006.01)
*F02D 9/10* (2006.01)
*F02D 11/02* (2006.01)

(56) References Cited

U.S. PATENT DOCUMENTS

| | | | |
|---|---|---|---|
| 7,287,512 B2 | 10/2007 | Possehl et al. | |
| 7,520,358 B2 | 4/2009 | Ehmanns et al. | |
| 7,571,073 B2 * | 8/2009 | Gamberini | B62K 23/04 702/150 |
| 7,729,849 B2 * | 6/2010 | Zanotti | B62K 11/14 324/207.25 |
| 7,770,490 B1 * | 8/2010 | Weiss | B62K 11/14 74/502.2 |
| 7,775,136 B2 * | 8/2010 | Schwulst | B62K 23/04 188/24.22 |
| 2003/0159529 A1 | 8/2003 | Samoto et al. | |
| 2004/0216550 A1 | 11/2004 | Fallak et al. | |
| 2007/0131471 A1 | 6/2007 | Ehmanns et al. | |
| 2010/0071450 A1 | 3/2010 | Tanaka et al. | |
| 2010/0162848 A1 | 7/2010 | Suzuki et al. | |
| 2011/0260557 A1 | 10/2011 | Noh et al. | |
| 2013/0049942 A1 | 2/2013 | Kim et al. | |
| 2016/0096431 A1 | 4/2016 | Drews et al. | |
| 2019/0202523 A1 * | 7/2019 | Erdmann | B62K 23/04 |

FOREIGN PATENT DOCUMENTS

| | | |
|---|---|---|
| DE | 102004033487 A1 | 2/2006 |
| DE | 102006057732 A1 | 7/2007 |
| DE | 102011055482 A1 | 2/2013 |
| DE | 102013213050 A1 | 1/2015 |
| EP | 1338502 A1 | 8/2003 |
| EP | 1464571 A2 | 10/2004 |
| EP | 2202139 A1 | 6/2010 |
| FR | 3063043 A1 | 8/2018 |
| WO | 2006005458 A1 | 1/2006 |
| WO | 2012155925 A1 | 11/2012 |

OTHER PUBLICATIONS

International Search Report and Written Opinion for International Application No. PCT/FR2018/050320, dated Jun. 14, 2018—8 pages .

* cited by examiner

SYSTEM FOR CONTROLLING A VEHICLE FITTED WITH ELECTRICAL CONTROLS

CROSS REFERENCE TO RELATED APPLICATIONS

This application is the U.S. National Phase Application of PCT International Application No. PCT/FR2018/050320, filed Feb. 9, 2018, which claims priority to French Patent Application No. 1751418, filed Feb. 23, 2017, the contents of such applications being incorporated by reference herein.

FIELD OF THE INVENTION

The technical field of the invention is man-machine interfaces for vehicles and, more specifically, such interfaces in the form of a handgrip.

BACKGROUND OF THE INVENTION

Historically, throttle control on a motorcycle has been a mechanical gas control in which the gas handgrip is connected to the intake system by a cable. Cable control makes it possible to have feedback regarding the degree of opening of the intake system (generally a butterfly valve or a slide valve) because of the return force of the return spring of said system.

Motorcycles fitted with electronic throttle control (ETC) systems, also known as "ride-by-wire" or electronic control systems, comprise a throttle handgrip connected to a position sensor.

In such a system, the handgrip no longer drives a cable connected to the intake system as it did in fully mechanical control systems, in which the return force varied with the torque demanded.

In the absence of feedback, it is difficult for the user to meet the request for torque, which may vary widely from one riding style to another.

For example, the stiffness of the handgrip is dependent on the tension of an internal spring and is fixed after design or adjustment.

Depending on the stiffness chosen, the use of the handgrip may be difficult or even uncomfortable, or may be too slack.

The following documents are known from the prior art.

Document DE 102013213050, incorporated herein by reference, discloses an active system the force feedback from the accelerator pedal of which is dependent on the pressure applied by the driver to the pedal and on the angle by which this pedal is depressed, for controlling speed or distance in traffic.

Document DE 102011055482, incorporated herein by reference, discloses an accelerator pedal for a hybrid vehicle which changes state according to whether it is the electrical or the combustion engine system that is providing the drive, giving the driver a different feel when depressing the pedal according to whether it is the combustion engine that is active or the electric motor that is active, so that the driver can easily recognise which form of drive is active.

Document US 20110260557, incorporated herein by reference, discloses an actuator arranged in parallel with the accelerator pedal return spring and which alters the resistance of the pedal when switching from combustion-engine drive to electric-motor drive and vice versa.

Document IN2003MU01102 (equivalent to FR 3063043), incorporated herein by reference, relates to a system for perceiving the opening of a gas butterfly valve on a vehicle fitted with a handlebar and with a throttle handgrip. The handgrip comprises a cam which offers a point of increased resistance to rotation of the handgrip upwards of a certain demanded power corresponding to an economical mode. This increased resistance is achieved by means of a cam that has to be overcome when leaving the economical mode to enter a power mode.

These documents thus disclose devices that enable the driver to be alerted to a change in driving/riding mode, for example a change between combustion-engine and electric modes in the case of hybrid vehicles or between economical and power modes on a combustion engine.

SUMMARY OF THE INVENTION

There is therefore a need for a system for controlling a vehicle fitted with electrical controls, fitted with a handgrip that provides feedback regarding the control of the vehicle.

There is also a need for a system for controlling a vehicle fitted with electrical controls and with a control handgrip that enables the travel of said handgrip to be modified during use.

One subject of an aspect of the invention is a system for controlling a vehicle fitted with electrical controls, the control system comprising a handgrip mounted on a shaft and fitted with a position sensor and with a return spring which is fixed by one end to the handgrip so as to generate a return moment that opposes the twisting of the handgrip. The system comprises at least one actuator able to move a cam mounted on the shaft and able to:

modify the preload of the return spring according to the position of the cam to which the other end of the return spring is fixed, and/or modify the travel of the handgrip by collaborating with an end stop of the handgrip, the end stop coming into contact with a cam at the end of the travel.

The return spring may be of the spiral spring type, wound around the shaft of the handgrip.

The position sensor may be an index sensor collaborating with an index attached to the handgrip, using mechanical or magnetic interaction.

The vehicle may be a vehicle fitted with a handlebar that controls the steering, the handgrip being fixed to a shaft of said handlebar that controls the steering.

The handgrip may be a throttle handgrip providing control over the acceleration of the vehicle.

Such a system offers the advantage of improving rider/driver control, while providing tactile feedback.

The vehicle may be a motorized vehicle having at least two wheels.

BRIEF DESCRIPTION OF THE DRAWINGS

Other objects, features and advantages of aspects of the invention will become apparent on reading the following description, given solely by way of nonlimiting example, and with reference to the appended drawings, in which.

DETAILED DESCRIPTION OF THE PREFERRED EMBODIMENTS

The system for controlling a vehicle fitted with electrical controls according to an aspect of the invention allows control of the return force of the handgrip spring by the electronic control unit that governs the other functions of the vehicle so as to be able to provide the rider/driver with feedback as to the demand for torque.

The system for controlling a vehicle fitted with electrical controls also allows control over the maximum travel of the throttle handgrip.

Figure 1:
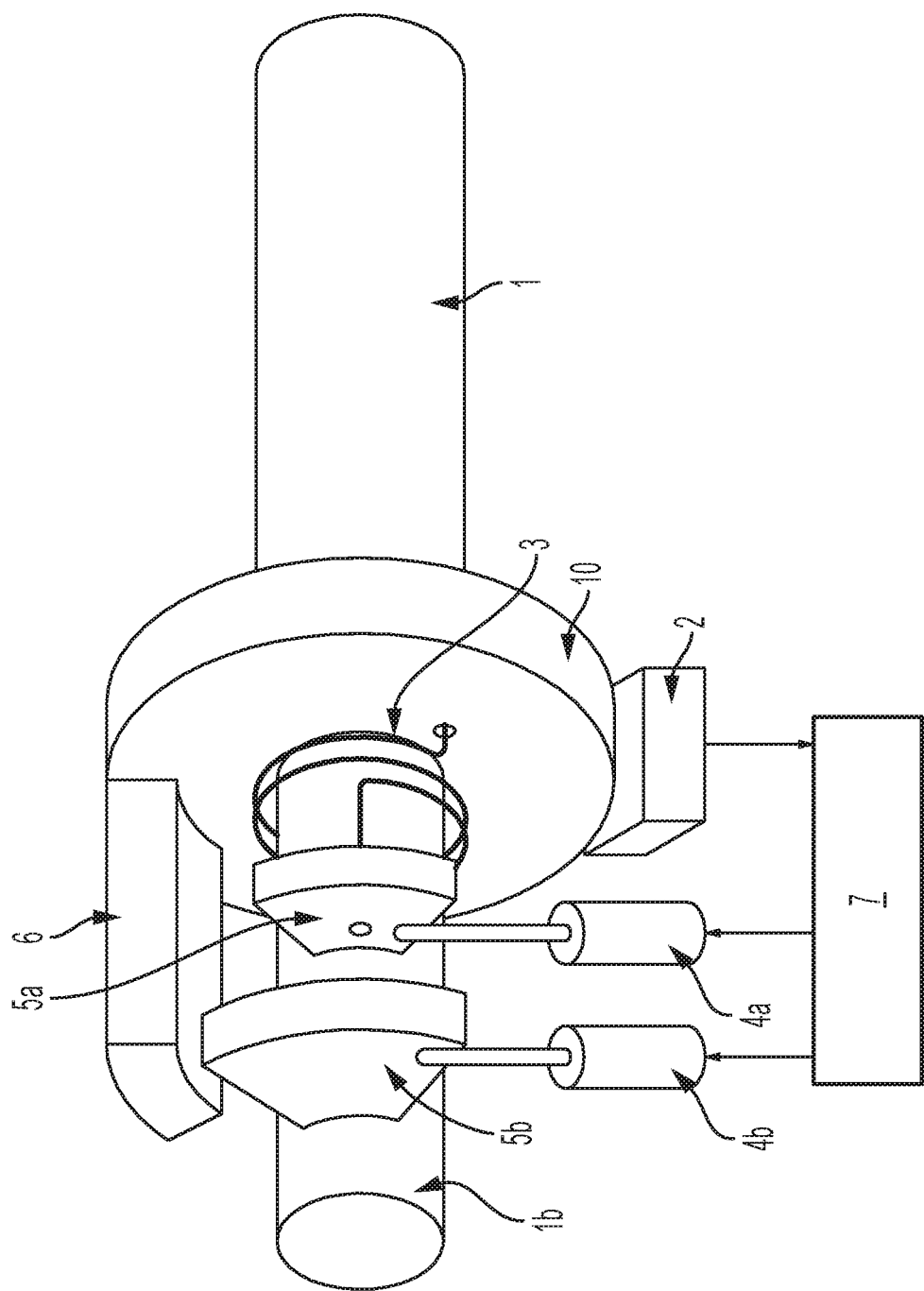
FIG. 1 illustrates a first embodiment of the system for controlling a vehicle fitted with electrical controls according to an aspect of the invention.

FIG. 1 illustrates a first embodiment of the system for controlling a vehicle fitted with electrical controls according to an aspect of the invention. The system comprises a handgrip 1, notably a throttle handgrip, mounted on a shaft 1b and fitted with a position sensor 2 and with a return spring 3 wound around the shaft 1b.

The system also comprises a first actuator 4a able to move a first cam 5a mounted on the shaft 1b and fixed to the return spring 3, the return spring also being fixed to the handgrip 1 in such a way as to generate a return moment that opposes the twisting of the grip 1 and that increases with increasing twisting of the handgrip 1. Moving the first cam 5a allows the preload to be modified.

The system comprises a second actuator 4b that makes it possible to move a second cam 5b mounted on the shaft 1b and collaborating with an end stop 6 of the handgrip in order to limit the travel thereof.

The position sensor 2 and the actuators 4a, 4b are connected to the electronic control unit 7.

The electronic control unit 7 receives the position of the handgrip via the position sensor 2 so as to determine the torque required and the corresponding engine commands. In return, it emits a control signal destined for the first actuator 4a in order to modify the position of the first cam 5a so as to act on the return spring 3 in order to modify the preload thereof. It is thus possible to modify the resistance felt by the rider/driver as he twists the handgrip.

In one exemplary embodiment, the handgrip offers more resistance to twisting when the torque is high and less resistance when the torque is low.

The electronic control unit 7 emits another control signal destined for the second actuator 4b so as to modify the angular position of the second cam 5b thereby limiting the travel available when twisting the handgrip 1 because of the presence of the end stop 6.

In one exemplary embodiment, it is thus possible to modify the maximum travel of the handgrip in such a way as to limit the travel needed to pass from zero torque to maximum torque. Such handgrip behavior is generally sought-after in competitions in order to limit the muscle fatigue of the rider and minimize the time taken to obtain maximum torque.

Figure 2:
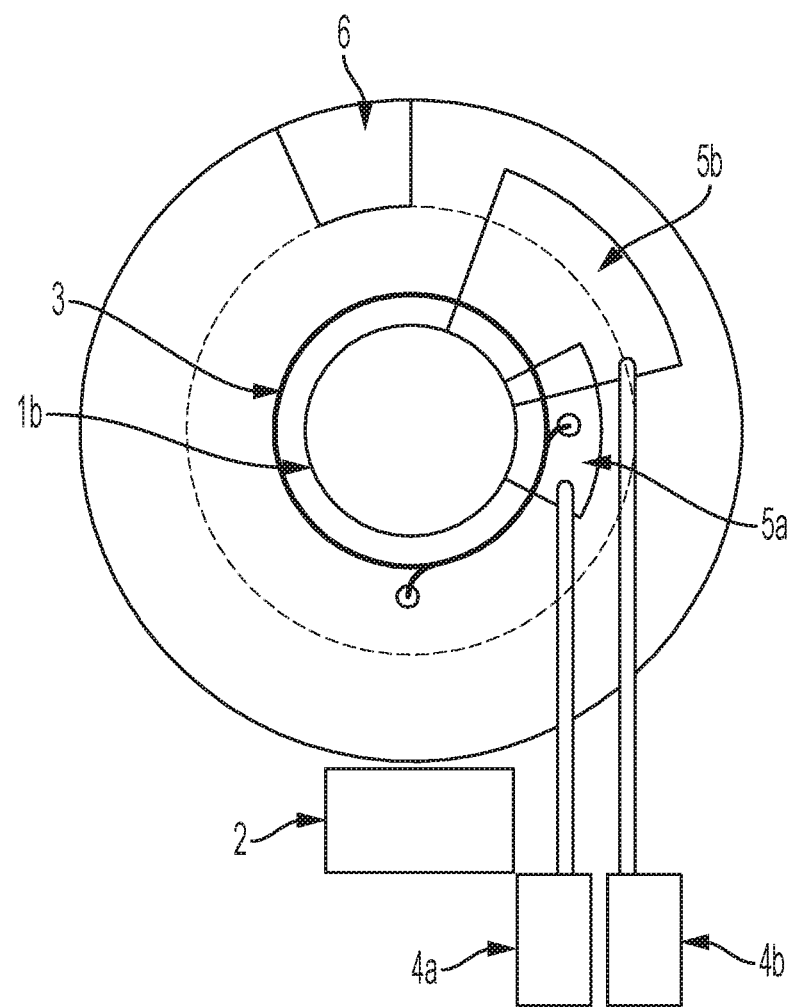
FIG. 2 illustrates the key elements of the system for controlling a vehicle fitted with electrical controls according to the first embodiment, in a view along the axis of the handgrip.

FIG. 2 illustrates the key elements of the system for controlling a vehicle fitted with electrical controls according to the first embodiment, in a view along the axis of the handgrip.

It can be seen that the external radius of the first cam 5a is smaller than the internal radius of the end stop 6 so as not to interfere.

On the other hand, the external radius of the second cam 5b is greater than the internal radius of the end stop 6 so as to be able to block the travel of the handgrip.

Although FIGS. 1 and 2 and the corresponding description describe a system comprising one cam/actuator assembly for modifying the preload of the handgrip return spring, and another cam/actuator assembly for modifying the travel of the handgrip, an electrical control system comprising just one cam/actuator assembly for modifying the travel of the handgrip remains within the scope of the present application.

Figure 3:
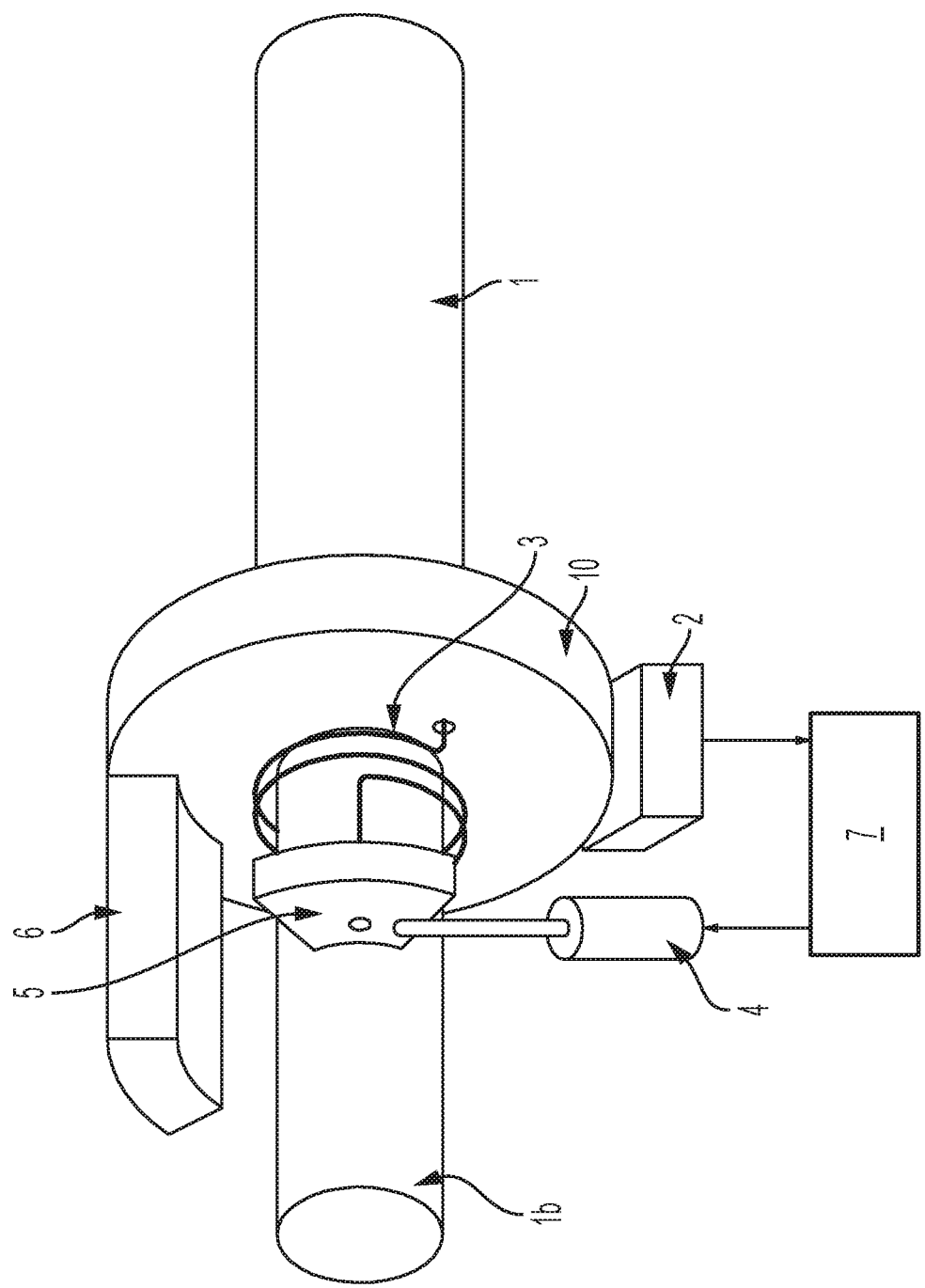
FIG. 3 illustrates a second embodiment of the system for controlling a vehicle fitted with electrical controls according to an aspect of the invention.

FIG. 3 illustrates a second embodiment of the system for controlling a vehicle fitted with electrical controls according to an aspect of the invention, in which the modification of the preload of the return spring 3 and the modification of the travel of the handgrip 1 are linked.

The system comprises a handgrip 1 mounted on a shaft 1b and fitted with a position sensor 2 and with a return spring 3 wound around the shaft 1b.

The system also comprises an actuator 4 able to move a cam 5 mounted on the shaft 1b and fixed to the return spring 3, the return spring also being fixed to the handgrip 1 in such a way as to generate a return moment that opposes the twisting of the grip 1 and that increases with increasing twisting of the handgrip 1. As in the first embodiment, moving the cam 5 makes it possible to modify the preload of the return spring.

The cam 5 also makes it possible to define the travel of the handgrip in collaboration with the end stop 6.

The position sensor 2 and the actuator 4 are connected to the electronic control unit 7.

The electronic control unit 7 receives the position of the handgrip via the position sensor 2 so as to determine the torque required and the corresponding engine commands. In return, it emits a control signal destined for the actuator 4 so as to modify the angular position of the cam 5 so as to act on the return spring 3 in order to modify the preload thereof and limit the travel available when twisting the handgrip 1, because of the presence of the end stop 6.

In one exemplary embodiment, the handgrip offers more resistance to twisting and less handgrip travel when the torque is high, and less resistance and more handgrip travel when the torque is low.

In another exemplary embodiment, the handgrip offers more resistance to twisting and less handgrip travel when the vehicle is moving in a sporty mode, and less resistance and more handgrip travel when the vehicle is moving in a touring mode.

Figure 4:
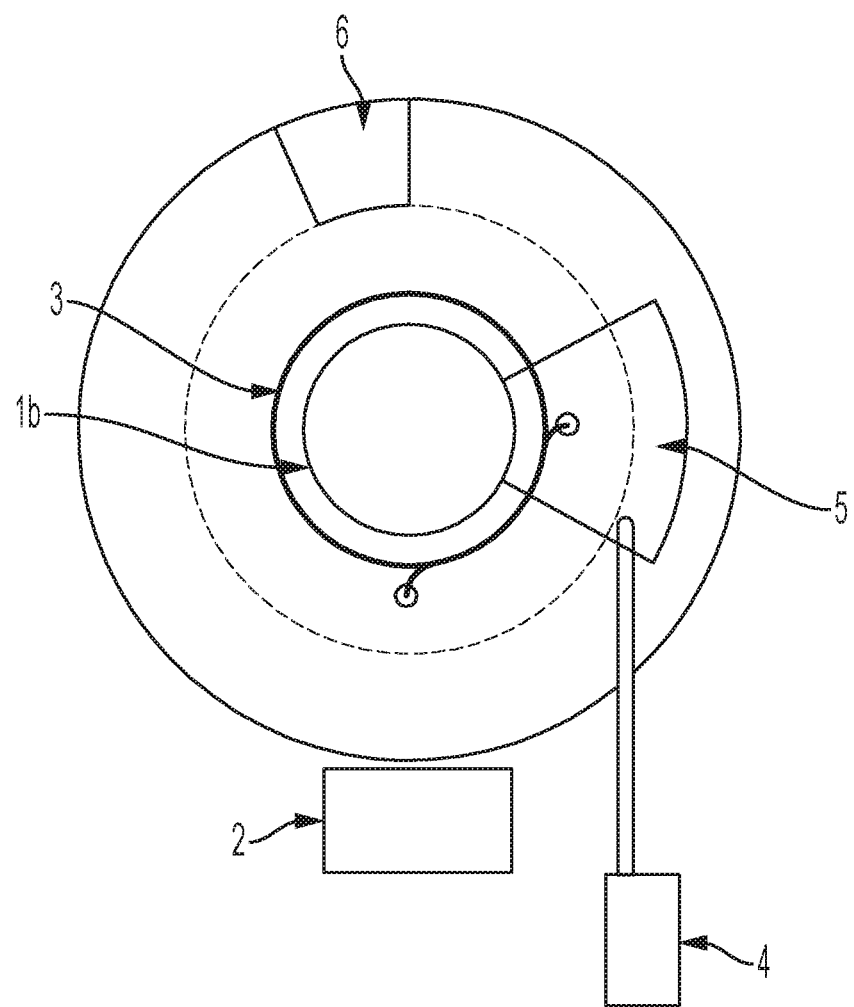
FIG. 4 illustrates the key elements of the system for controlling a vehicle fitted with electrical controls according to the second embodiment, in a view along the axis of the handgrip.

FIG. 4 illustrates the key elements of the system for controlling a vehicle fitted with electrical controls according to the second embodiment, in a view along the axis of the handgrip.

It may be seen that the external radius of the cam 5 is greater than the internal radius of the end stop 6 so as to be able to block the travel of the handgrip while being connected to the return spring 3.

In the embodiments illustrated, the return spring 3 is of the spiral spring type, wound around the shaft 1b of the handgrip. However, other types of spring may be employed, notably a tension spring.

The position sensor 2 may notably be an index sensor collaborating with an index 10 attached to the handgrip 1, using mechanical or magnetic interaction, such as a potentiometer or a Hall-effect sensor.

The invention claimed is:

1. A system for controlling a vehicle fitted with electrical controls, the control system comprising:

a handgrip mounted on a shaft of a handlebar;

a position sensor;

a return spring which is fixed by one end to the handgrip so as to generate a return moment that opposes twisting of the handgrip; and at least one actuator able to move a cam mounted on the shaft and able to:

modify a preload of the return spring according to a position of the cam to which an opposite end of the return spring is fixed, and/or modify travel of the handgrip by collaborating with an end stop of the handgrip, the end stop coming into contact with the cam at the end of the travel.

2. The system for controlling a vehicle fitted with electrical controls as claimed in claim 1, wherein the return spring is of the spiral spring type, wound around the shaft of the handgrip.

3. The system for controlling a vehicle fitted with electrical controls as claimed in claim 2, wherein the position sensor is an index sensor collaborating with an index attached to the handgrip, using mechanical or magnetic interaction.

4. The system for controlling a vehicle fitted with electrical controls as claimed in claim 1, wherein the handlebar controls the steering of the vehicle, the handgrip being fixed to the shaft of said handlebar.

5. The system for controlling a vehicle fitted with electrical controls as claimed in claim 1, wherein the handgrip is a throttle handgrip providing control over the acceleration of the vehicle.

6. The system for controlling a vehicle fitted with electrical controls as claimed in claim 1, wherein the position sensor is an index sensor collaborating with an index attached to the handgrip, using mechanical or magnetic interaction.

7. A system for controlling a motorized vehicle having at least two wheels and fitted with a control system, wherein the control system comprises:

a handgrip mounted on a shaft;

a position sensor;

a return spring which is fixed by one end to the handgrip so as to generate a return moment that opposes twisting of the handgrip; and at least one actuator able to move a cam mounted on the shaft and able to:

modify a preload of the return spring according to a position of the cam to which an opposite end of the return spring is fixed, and/or modify travel of the handgrip by collaborating with an end stop of the handgrip, the end stop coming into contact with the cam at the end of the travel.

* * * * *